March 20, 1962 W. E. BRUNING 3,025,804
GRAIN CAR BULKHEAD
Filed Aug. 3, 1959
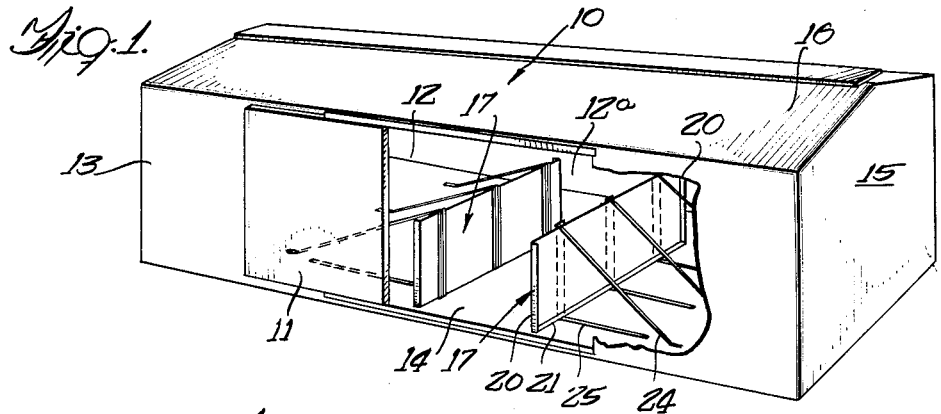
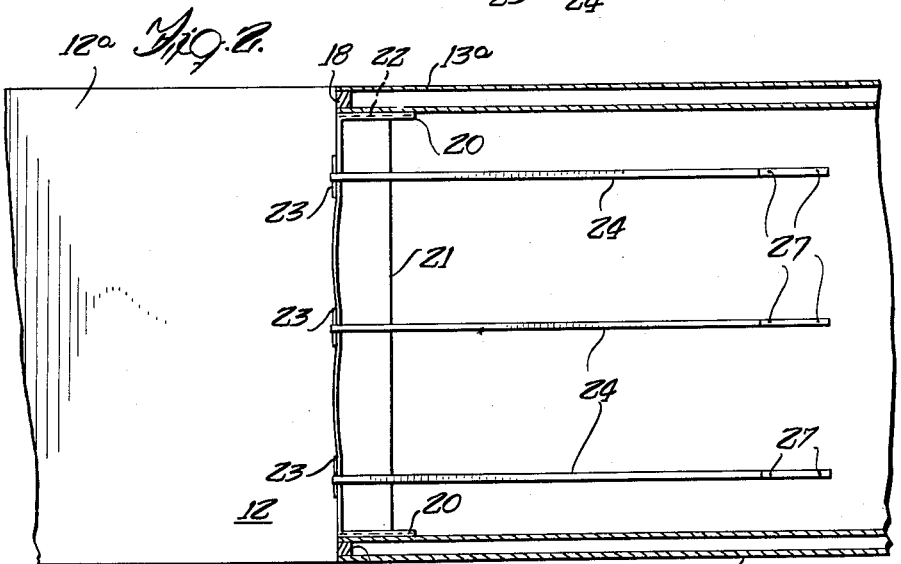
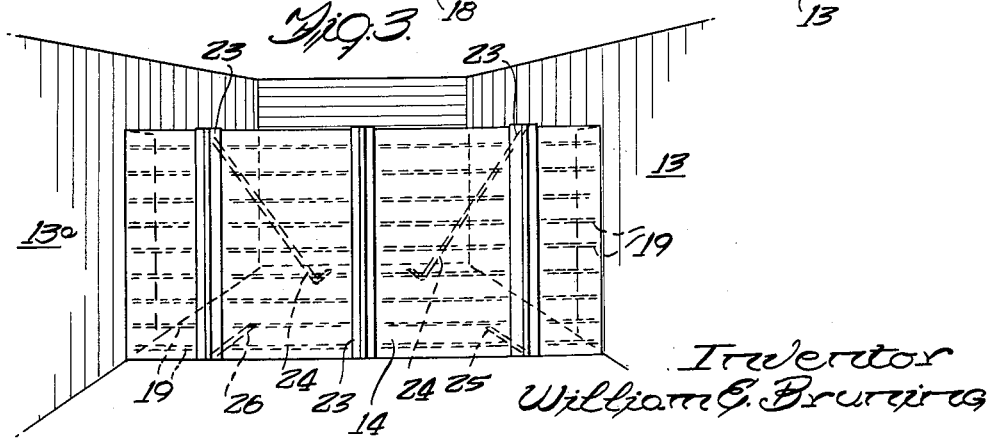
Inventor
William E. Bruning
Attorneys United States Patent Office 3,025,804
Patented Mar. 20, 1962

3,025,804
GRAIN CAR BULKHEAD
William E. Bruning, Omaha, Nebr., assignor, by mesne assignments, of one-half to International Paper Company, New York, N.Y., a corporation of New York, and one-half to The Stanley Works, New Britain, Conn., a corporation of Connecticut
Filed Aug. 3, 1959, Ser. No. 831,109
5 Claims. (Cl. 105—376)

This invention relates to a grain car bulkhead and, more particularly, to a disposable bulkhead equipped with novel structural elements securing the bulkhead transversely in a grain-carrying freight car.

In the transportation of granular material, food grains, minerals, etc., the granular materials are introduced into the vehicle in bulk form. It has been the practice to provide temporary barriers to support the granular materials in place until the destination is reached. Two principal barrier arrangements have been employed. In one, a temporary door is installed across each car doorway and fastened to the interior of the car, generally on the doorway framing posts. This permits the sliding storm doors to be closed after the car is loaded. The other type of barrier installation involves the use of a pair of transverse bulkheads extending athwart the car and on opposite sides of the doorways so that an aisle, in effect, is provided. The latter installation is preferred in many instances, since it permits access to the car during the loading operation so as to achieve a better balanced load. Also, smaller equipment can be used, and, in general, the loading and unloading operations are facilitated.

The bulkhead type barrier, although possessing certain advantages, suffers from certain drawbacks. Among these drawbacks is the need for extensive reinforcement of any temmporary panel employed as the barrier, since the panel is subjected to tremendous shocks—shocks that are of greater magnitude than those to which the door-type barriers are subjected. The granular load exhibits the greatest tendency to shift longitudinally of the car whenever the car is stopped, started, jerked, humped, etc. Only a relatively small shifting of granular material occurs in a lateral direction.

Attempts have been made in the past to bolster transverse bulkheads by means of beams supported by tie-wires, and the like. Where these have been effective to immobilize the beam providing the panel reinforcement, the tie-wires have usually passed through the panel and thus necessarily required an aperture in the panel. Any panel aperture presents a dangerous condition, since the pressure of granular material invariably tends to enlarge any opening. Where the supporting wires or straps have not passed through the panel, they have been found ineffective to immobilize the reinforcing means so that under the buffeting of the granular load, the bulkhead tends to shift position and eventually reach a condition in which failure is imminent.

One of the principal objects of this invention is to provide a structure which overcomes the aforementioned difficulties and which therefore provides a superior bulkhead arrangement, especially for use in connection with grain-carrying freight cars. Another object of this invention is to provide a grain car bulkhead in which the bulkhead is equipped with rigid reinforcing members stabilized in their installed position and utilizing therefor strap-type elements which are free of any deleterious action on the panel portion of the bulkhead.

Still another object is to provide a transverse bulkhead suitably reinforced and secured in place by a minimum of carpentry operations and which is relatively free of any deleterious action on the freight car in which it is installed. These and other objects and advantages of the invention can be seen as the specification proceeds.

The invention will be explained in conjunction with an illustrative embodiment in the accompanying drawing, in which—

FIG. 1 is a perspective view, partially broken away, of a freight car equipped with bulkheads incorporating teachings of the invention;

FIG. 2 is a fragmentary top plan view of a bulkhead-equipped freight car; and

FIG. 3 is a fragmentary enlarged perspective view of the interior of the freight car as would be viewed looking toward one end thereof from the longitudinal center of the car.

In the illustration given, the numeral 10 designates generally a railway boxcar which is shown in more or less outline form, the trucks and undercarriage in general being omitted, since this is not essential to the understanding of the invention. The car 10 is equipped with the usual sliding storm door 11 defining a doorway 12 in the side wall 13. A second doorway 12a is provided in the other side wall 13a. The car is also equipped with a floor 14, end walls 15, and a top wall or roof 16, all in accordance with conventional practice.

Transverse bulkheads, generally designated 17 (see FIG. 1), are shown mounted in place athwart car 10 approximately in line with the side framing 18 of the doorways 12 and 12a of car 10.

The bulkheads 17 are preferably constructed of a flexible cellulosic material such as paperboard and may be constructed of corrugated paperboard in which a plurality of horizontally-extending flexible flat metal straps 19 (see FIG. 3) are interiorly mounted in the bulkhead. The bulkhead 15 may also be equipped with side flaps 20 and a bottom or floor flap 21. The general type of panel construction employed for bulkheads may be seen in the copending application of Barton H. Ford, Serial No. 568,482, filed February 29, 1956, now Patent No. 2,966,213 dated Dec. 27, 1960, and reference may be made to that application for particulars of construction not specifically set forth herein.

The straps 19 may, if desired, be secured to the framing posts 18 in the fashion designated by the numeral 22 and seen in dotted line in FIG. 2. However, the straps 19 need not be so secured, inasmuch as the weight of the granular load is effective to press the flaps 20 tightly against the side walls 13 and 13a and thus prevent leakage of granular material therebetween.

Even if the straps 19 are secured to the framing posts 18 as indicated in FIG. 2 by the numeral 22, there is much less wear anl tear on the framing posts, since the principal load on the bulkhead is taken up by other members rather than by the straps 19.

The means for supporting and reinforcing the bulkhead 17 can be seen to include a plurality of rigid vertical members 23 in the usual installation may be 1" x 6" x 6' rough wood boards, and the members 23 are maintained in place by straps 24 which, in the illustration given, can be 1¼" wide steel strapping having a thickness of .050" and a length of about 20 feet. The straps 24 are secured at one end thereof as at 25 to the floor 14 as by nails 26. The straps 24 then extend longitudinally of the car and under the floor flap 21 to a point on the other side of the bulkhead 17. The straps 24 then extend upwardly along the outer side of the rigid members 23 and further extend rearwardly and downwardly to the floor 14. When the members 23 are secured as just described and a granular load is introduced into the car 10 between the end wall 15 and the bulkhead 17, the bulkhead 17 tends to bulge or belly somewhat, as can be appreciated from a consideration of FIG. 2.

I have found that through the structure just disclosed the top portion of the strap, being angled downwardly, tends to keep the rigid member from riding up and backwardly under the repeated shocks to which the bulkhead 17 is subjected. The stabilization or immobilization of the reinforcing members is especially important since it assures that there is always reinforcement for the bottom portion of the bulkhead 17, i.e., the portion nearest the floor where the grain pressure is the heaviest.

Merely by altering the length of the straps 24 or the relative lengths of the top and bottom end portions thereof, the straps can be secured to the floor or other portion of the car in a new area and one that has not been splintered or chipped by previous nailing. For this purpose, the straps may be equipped with nail openings such as are designated in FIG. 3 by the numeral 27.

While, in the foregoing specification, I have set forth a detailed description of an embodiment of the invention for the purpose od illustrating the same, many changes in the details herein given will be appreciated by those skilled in the art without departing from the spirit and scope of the invention.

I claim:

1. In combination with a grain-carrying freight car having a floor, a generally rectangular, flat, flexible panel disposed across the car transversely of the length thereof and having the panel bottom edge resting on said floor, a rigid, elongated member having flat opposite faces positioned on one side of said panel with one face in contact with the panel, said member having its length oriented vertically and extending from said floor to the top edge of said panel, and a flexible strap positioned adjacent said member in contact with the other face of said member, said strap having end portions extending over the top edge and under the bottom edge of said panel, said end portions being secured to said car floor on the other side of said panel at a spaced distance from the other side of said panel.

2. In combination with a grain-carrying freight car having a floor, a generally rectangular, flexible panel disposed across the car transversely of the car length, said panel being equipped with a bottom edge in engagement with said floor, a plurality of rigid, elongated, board-like members each having flat oppositely-disposed faces, said members being positioned on one side of said panel with one face of each member in contact with said panel, said members each having their length oriented vertically and extending from said floor to the top edge of said panel, and a flexible strap positioned adjacent each of said members in contact with the other face thereof, each of said straps extending over the top edge and under the bottom edge of said panel with the ends of said straps being secured to said car floor on the other side of said panel at a spaced distance from the other side of said panel.

3. In combination with a grain-carrying freight car having a floor, a generally rectangular, flat, flexible panel disposed across the car transversely of the length thereof and having the panel bottom edge resting on said floor, a rigid, elongated member having flat opposite faces positioned on one side of said panel with one face in contact with the panel, said member having its length oriented vertically and extending from said floor to the top edge of said panel, and a flexible strap positioned adjacent said member in contact with the other face of said member, said strap having end portions extending over the top edge and under the bottom edge of said panel, said end portions being secured to said car floor on the other side of said panel at a spaced distance from the other side of said panel, said panel being equipped with a plurality of horizontally-extending, flexible straps, the pressure of grain within said car urging said horizontal straps into bearing relation with said member.

4. In combination with a boxcar having top, side, end and bottom walls, said side walls being equipped with doorways, a flexible bulkhead extending between said side walls, an elongated rigid vertical member having oppositely-disposed faces with one of said faces bearing against one side of said bulkhead, said member having a height substantially that of the bulkhead and having its lower end positioned against said bottom wall, an elongated flexible strap secured adjacent one end thereof to said bottom wall on the side of said bulkhead remote from said member, said strap extending under said bulkhead and upwardly along said member in bearng relation therewith, said strap extending over the top of said member and said bulkhead and angularly downwardly toward said one end, the other end of said strap being secured to a car wall at a spaced distance from the other side of said bulkhead.

5. In combination with a boxcar having top, side, end, and bottom walls, a flexible bulkhead extending between said side walls and having a bottom flap disposed in contact with said bottom wall and extending toward one of said end walls, an elongated rigid vertical member having opopsitely-disposed flat faces with one of said faces bearing against one side of said bulkhead on the side thereof remote from said one end wall, said member having a height substantially that of the bulkhead and having its lower end in contact with said bottom wall, an elongated flexible strap secured adjacent one end thereof to said bottom wall on the side of said bulkhead adjacent said one end wall, said strap extending under said bulkhead and upwardly along said member in bearing relation therewith, said strap being positioned against the other of said faces, said strap extending over the top of said member and said bulkhead and angularly downwardly toward said one end wall, the other end of said strap being secured to a car wall at a spaced distance from the other side of said bulkhead.

References Cited in the file of this patent
UNITED STATES PATENTS

| | | |
|---|---|---|
| 1,499,229 | Laffey | June 24, 1924 |
| 2,361,081 | Brandon | Oct. 24, 1944 |
| 2,570,368 | Moon | Oct. 9, 1951 |
| 2,895,431 | Ford | July 21, 1959 |